United States Patent Office 3,007,762
Patented Nov. 7, 1961

3,007,762
PROCESS FOR DYEING POLYHYDROXYLATED MATERIALS
Jacques Wegmann and Peter Stahel, Basel, Switzerland, assignors to Ciba Limited, Basel, Switzerland
No Drawing. Filed Aug. 5, 1957, Ser. No. 676,437
Claims priority, application Switzerland Aug. 14, 1956
16 Claims. (Cl. 8—54.2)

This invention provides a process for dyeing polyhydroxylated materials of fibrous structure, such as cellulose-containing textile materials, by the known printing or foularding method, but in which the material to be dyed is not, as in the known direct-dyeing method, impregnated in a dyebath at a liquor ratio of at least 1:3, and usually higher than 1:10, only with a part of the dyestuff solution required to produce the desired shade (so that the dyestuff dissolved in the dyebath is in equilibrium with the dyestuff on the substratum to be dyed) and dyed in the bath so that the dyestuff is either gradually taken up by the fiber or otherwise caused to pass from the dyebath on to the fiber, but is impregnated with the whole quantity of dyestuff solution required to give the desired tint or printed with a printing color containing the dyestuff, and the dyestuff applied to the material is fixed thereon.

In the process of this invention very valuable dyeings and prints are obtained by the foularding or printing method by using an organic dyestuff which contains at least one, and advantageously more than one, acid group imparting solubility in water and at least one aliphatic halogenated acylamino group, and fixing the dyestuff on the material to be dyed.

As aliphatic halogenated acylamino groups there may be mentioned more especially the radicals of aliphatic, and advantageously low molecular aliphatic, sulfonic acids or especially carboxylic acids, which radicals contain an aliphatically bound chlorine atom. Advantageously, the chlorine atom is in the γ- or β-position of the acyl radical bound to the dyestuff molecule through the amino group, for example, in the β-position of an alkane-sulfonyl group, or more especially in the β-position of the acyl radical of an aliphatic carboxylic acid. Especially valuable results are obtained with those dyestuffs of which the acyl group contains an alkyl group of at least two carbon atoms, for example, dyestuffs containing a β-chlorethane-sulfonylamino group or more especially a β-chloropropionyl amino group.

In addition to at least one halogenated acylamino group of the kind defined above the dyestuffs used in the process of this invention contain at least one acid, and advantageously strongly acid, group imparting solubility in water such as an acylated sulfonic acid group, a carboxylic acid group or advantageously a sulfonic acid group. It is of advantage to use dyestuffs which contain more than one such group imparting solubility in water.

As soluble organic dyestuffs there may be used dyestuffs of a very wide variety of classes, for example, stilbene dyestuffs, azine dyestuffs, dioxazine dyestuffs, and above all acid phthalocyanine dyestuffs and especially anthraquinone dyestuffs and azo-dyestuffs, including metal-free or metalliferous monoazo- and polyazo-dyestuffs. Especially good results are obtained with soluble azo-dyestuffs which possess little or no affinity for cotton.

A large number of dyestuffs of the above kinds is known or can be made by methods in themselves known, for example, from dyestuff components which already contain a halogenated acylamino group as aforesaid, or the halogenated acylamino group or a radical containing such group may be introduced into the dyestuff after its manufacture by methods in themselves known. Thus, for example, by acylating an azo-dyestuff containing an acylatable amino group, and more especially a free amino group, with an acid halide or acid anhydride of a halogenated aliphatic acid, for example, chlorethane sulfonic acid chloride or chlorobutyric acid chloride or chloropropionic acid chloride, valuable dyestuffs are obtained, which contain an exchangeable chlorine atom and are suitable for dyeing by the process of this invention. The azo-dyestuffs to be used as starting materials can be made, for example, by the coupling method. Thus, in a dyestuff component, which contains an acylatable amino group in addition to the group necessary for dyestuff formation, the aforesaid halogenated acylamino group may be introduced before the dyestuff is made, and then the dyestuff is subsequently made by diazotization and coupling, care being taken by suitably choosing the conditions, for example, by working at a temperature as low as possible, that the halogen atom bound in the aliphatic radical of the acylamino group is not hydrolyzed.

With the aforesaid dyestuffs it is possible to dye on a foulard or print polyhydroxylated materials, especially cellulose-containing materials, and also synthetic fibers, for example, of polyvinyl alcohol, regenerated cellulose or viscose, and also natural materials, for example, linen and especially cotton. Advantageously there are used aqueous solutions of the dyestuffs. With such solutions, which may with advantage contain more or less neutral, especially inorganic, salts such as alkali metal chlorides or sulphates, and may also contain preferably inorganic acid-binding agents, such as alkali metal carbonates, alkali metal phosphates, alkali metal borates or perborates or mixtures of these salts, and especially buffer mixtures of such agents, the material to be dyed is impregnated advangeously in the cold or at a moderately raised temperature or, if no alkali is present. at a hot temperature, for example, at 60–80° C., and the material is squeezed in the usual manner. Advantageously the material is squeezed so as to retain from 0.5 to 1.3 parts of dyestuff solution per part by weight of the untreated material.

The fixation of the dyestuff on the material impregnated with the dyestuff solution is carried out after the impregnation. For this purpose, for example, the impregnated material, if desired, after being dried, and, if the impregnating solution contained no acid-binding agent, after treating the material with a hot or cold aqueous alkaline solution, for example, a salt-containing solution of an alkali metal hydroxide, may be steamed or, for example, heated in a current of warm air for a short time. By using an impregnating bath which is substantially neutral or contains no substances yielding alkali the impregnated material may, if desired, be laid aside for a considerable time before the fixation is carried out, and this may be an important advantage if the layout of the apparatus makes it desirable to do so. Instead of carrying out the fixation with the aid of a separate alkaline bath, the impregnating solution may contain an alkali or substance yielding alkali, such as sodium bicarbonate, from the outset, and the impregnated material, without being dried or subjected to treatment with an alkali, steamed directly or subjected to a heat treatment.

Instead of preparing the solution to be used for the impregnation by dissolving the dyestuff and, if desired, a more or less neutral inorganic salt simultaneously or in succession in water, the dyestuff and the salt may be worked up into paste-form or advantageously into a dry preparation. The preparations to be used for making impregnating solutions may have incorporated therewith, in addition to or instead of the aforesaid salt, a non-electrolyte such as urea and, if desired, buffer salts or agents capable of yielding alkali when heated.

Instead of applying the aforesaid dyestuffs to the material by impregnation they may be applied thereto by printing. For this purpose there are used, for example, printing colors which contain in addition to the usual agents used in printing, for example, wetting and thickening agents, at least one of the aforesaid dyestuffs and, if desired, an acid-binding agent or a substance capable of yielding such an agent.

As auxiliary agents for making the printing pastes there may be used, for example, urea and thickening agents, such as alkyl-celluloses, for example, methyl cellulose, alginates or the like.

As acid-binding agents and substances capable of yielding such agents there may be mentioned more especially alkali metal salts such as potassium cyanide, sodium carbonate or bicarbonate, disodium or trisodium phosphate or mixtures of mono-, di- and tri-sodium phosphate and also alkali metal hydroxides or alkaline earth metal hydroxides, especially sodium hydroxide. When the printing color does not contain such an agent, the printed material is subjected to a treatment with alkali, advantageously in a strong salt-containing solution of an alkali metal carbonate and with advantage of an alkali metal hydroxide or alkaline earth metal hydroxide, and the material is subsequently subjected to the action of heat, if desired, in the presence of water vapour. If the printing color contains an acid-binding agent or a substance which, for example, becomes more alkaline when heated, treatment of the printed material with alkali before the heating or steaming is unnecessary.

In the process of this invention there are produced very valuable strong and generally very full dyeings or prints having excellent properties of wet fastness and of very good fastness to light, on polyhydroxylated, and expecially cellulose-containing, materials even with the use of dyestuffs of the above definition which have little or no affinity for cotton.

In certain cases it may be of advantage to subject the dyeings or prints obtained by the process to an aftertreatment. Thus, for example, the dyeings produced are advantageously soaped, and in this manner any incompletely fixed dyestuff is removed. When the dyestuff used for dyeing or printing in the present process contains metallizable groups, the dyestuffs may be subjected to an aftertreatment with an agent yielding heavy metal, especially an agent yielding copper.

The following examples illustrate the invention, the parts and percentages being by weight. Although the formulae show the dyestuffs in the free acid form, they are used in the form of alkali metal salts.

*Example 1*

1 part of the dyestuff of the formula

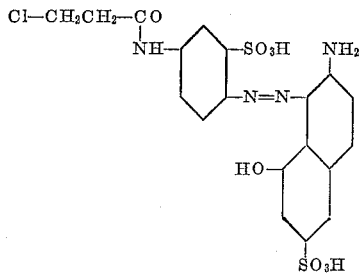

is dissolved in admixture with 9 parts of urea in 100 parts of water. A cotton fabric is impregnated on a foulard with the resulting solution at 80° C., and the excess of liquid is squeezed off until it retains 75% of its weight of dyestuff solution.

The material so impregnated is dried, then impregnated at room temperature with a solution containing, per liter, 10 grams of sodium hydroxide and 300 grams of sodium chloride, and is then squeezed to a weight increase of 75% and steamed for 60 seconds at 100–101° C. The material is then rinsed, treated in sodium bicarbonate solution of 0.5% strength, rinsed again, soaped for ¼ hour in a solution of 0.3% strength of a non-ionic detergent at the boil, rinsed and dried.

There is obtained a red dyeing fixed fast to boiling. By using, instead of a cotton fabric, a fabric of staple fibers of regenerated cellulose a similar good result is obtained.

The dyestuff used can be prepared, for example, as follows:

30 parts of hydrochloric acid of 30% strength are added to a solution of 27.85 parts of 4-β-chloropropionylamino-1-aminobenzene-2-sulfonic acid in 400 parts of water, and the amine is diazotized at 0–5° C. in the usual manner with 25 parts by volume of a 4 N-solution of sodium nitrite. The diazo-compound, after being freed from nitrous acid, is mixed with sodium acetate until the solution is only weakly acid to Congo, and then mixed with a suspension obtained by dissolving 23.9 parts of 2-amino-8-hydroxynaphthalene-6-sulfonic acid in 105 parts by volume of a 1 N-solution of sodium hydroxide and acidifying the mixture with 100 parts by volume of 2 N-acetic acid. The whole is stirred at about 20° C. until coupling is complete, and about 140 parts of sodium chloride are added, and the precipitated dyestuff is filtered off, washed with sodium chloride solution of 10% strength and dried.

By using the dyestuff of the formula

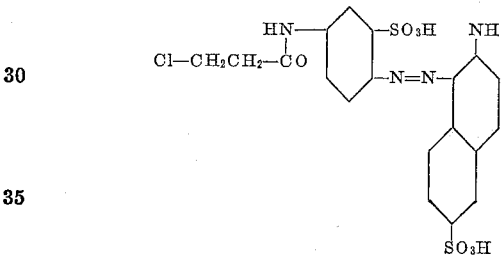

an orange-yellow dyeing is obtained.

*Example 2*

1 part of the dyestuff of the formula

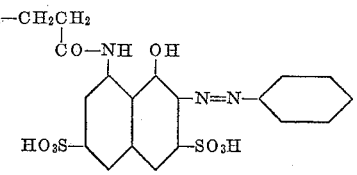

is dissolved in 100 parts of water and applied to a fabric of staple fibers of regenerated cellulose by the method described in Example 1. There is obtained a bluish red dyeing of excellent fastness to washing.

The dyestuff of the above formula can be prepared for example, as follows:

9.3 parts of aniline are diazotized in known manner and slowly added dropwise to a solution of 41 parts of 1-β-chloropropionylamino-8-naphthol-3:6-disulfonic acid in 100 parts by volume of a 2 N-solution of sodium carbonate and 400 parts of water at 0–5° C. When the coupling is finished, about 70 parts of sodium chloride are added, and the precipitated dyestuff is filtered off, washed with sodium chloride solution of 10% strength and dried.

A somewhat more yellowish dyeing can be obtained by using the corresponding dyestuff obtained from 1-β-chloropropionylamino-8-naphthol-4:6-disulfonic acid.

*Example 3*

30 parts of hydrochloric acid of 30% strength are added to a solution of 27.85 parts of 4-β-chloropropionylamino-2-aminobenzene-sulfonic acid in 400 parts of water, and diazotization is carried out at 0–5° C. in the usual manner with 25 parts by volume of a 4 N-solution of sodium nitrite. After being freed from nitrous acid, the diazo compound is slowly added dropwise to a solution of 27.45 parts of 1-(2'-chlorophenyl)-3-methyl-5-pyrazolone-5'-sulfonic acid in 100 parts by volume of a 2 N-solution of sodium carbonate and 200 parts of water at 0–5° C. The whole is stirred at 0–5° C. until the coupling is finished, about 75 parts of sodium chloride are added, and the precipitated dyestuff is filtered off, washed with sodium chloride solution of 10% strength and dried.

1 part of the dyestuff so obtained is dissolved in 100 parts of water at 50° C. A cotton fabric is impregnated with the solution and dried. The fabric is then impregnated wtih a solution at 20° C. containing, per liter, 10 grams of sodium hydroxide and 300 grams of sodium chloride, and the material is squeezed to a weight increase of 75%, the dyeing is steamed for 60 seconds at 100–101° C., rinsed, treated with a sodium bicarbonate solution of 0.5% strength, rinsed, soaped for ¼ hour in a solution of 0.3% strength of a non-ionic detergent at the boil, rinsed and dried. There is obtained a greenish yellow dyeing fixed fast to boiling.

*Example 4*

1 part of the dyestuff of the formula

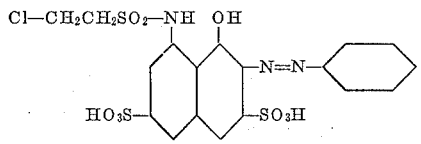

is dissolved in 100 parts of water, and applied to a fabric of staple fibers of regenerated cellulose by the method described in Example 1. There is obtained a pure bluish red dyeing of excellent fastness to washing.

The dyestuff of the above formula can be prepared, for example, as follows:

9.3 parts of aniline are diazotized and slowly added dropwise to a solution of 44.5 parts of 1-β-chlorethane-sulfonylamino-8-hydroxynaphthalene-3:6 - disulfonic acid (obtained by reacting 1-amino-8-hydroxynaphthalene-3:6-disulfonic acid with β-chlorethane sulfonyl chloride in the presence of sodium acetate or sodium bicarbonate) in 100 parts by volume of a 2 N-solution of sodium carbonate and 400 parts of water at 0–5° C. When the coupling is finished about 70 parts of sodium chloride are added, and the precipitated dyestuff is filtered off, washed with sodium chloride solution of 10% strength and dried.

*Example 5*

1 part of the dyestuff of the formula

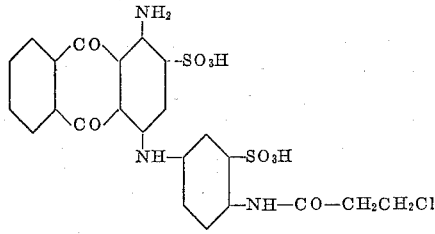

is dissolved in admixture with 9 parts of urea in 100 parts of water. A cotton fabric is impregnated on a foulard with the resulting solution at 80° C., the excess of liquid is squeezed off until the material retains 75% of its weight of dyestuff solution. The impregnated material is dried, then impregnated at room temperature with a solution containing, per liter, 10 grams of sodium hydroxide and 300 grams of sodium chloride, squeezed to a weight increase of 75% and steamed for 60 seconds at 100–101° C. The material is then rinsed, treated with a sodium bicarbonate solution of 0.5% strength, rinsed, soaped for a ¼ hour in a solution of 0.3% strength of a non-ionic detergent at the boil, rinsed and dried.

There is obtained a pure blue dyeing fixed fast to washing. By using, instead of a cotton fabric, a fabric of staple fibers of regenerated cellulose a similar good result is obtained.

If the impregnation with the dyestuff solution is carried out at 30° C., instead of 80° C., a similar good result is obtained.

*Example 6*

1 part of the complex copper compound of the monoazo-dyestuff of the formula

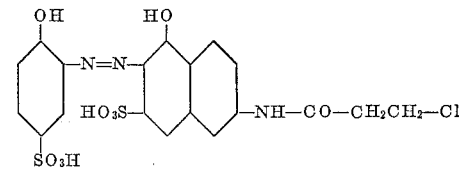

is dissolved in 100 parts of water. A fabric of staple fibers of regenerated cellulose is impregnated with the solution so obtained so that the increase in weight of the fabric is 75%, and the fabric is then dried. The fabric is then impregnated with a solution at 20° C. which contains per liter, 10 grams of sodium hydroxide and 300 grams of sodium chloride, then squeezed to a weight increase of 75%, and the dyeing is steamed for 60 seconds at 100–101° C., rinsed, soaped for ¼ hour in a boiling solution of 0.3% strength of a non-ionic detergent, rinsed and dried. In this manner a fast ruby red dyeing is obtained.

By using a cotton fabric, instead of a fabric of staple fibers of regenerated cellulose, a similarly good result is obtained.

*Example 7*

2 parts of the dyestuff mentioned in Example 6 are mixed with 5 parts of urea in 41 parts of water, and the mixture is stirred into 50 parts of a sodium alginate thickening of 4% strength. 2 parts of sodium carbonate are added, and a cotton fabric is printed with the resulting printing color on a roller printing machine. After being dried, the printed fabric is steamed for 6 minutes at 100–101° C. It is then rinsed, soaped for 15 minutes at the boil with a solution of 0.3% strength of a non-ionic detergent, rinsed and dried. There is obtained a ruby red print fixed fast to boiling.

The dyestuff used in this example may be prepared as follows:

43.9 parts of the monoazo-dyestuff obtained by coupling diazotized 1-hydroxy-2-aminobenzene-4-sulfonic acid in an alkaline medium with 2-amino-5-hydroxy-naphthalene-7-sulfonic acid are dissolved in 750 parts of water at 70–80° C. For the purpose of coppering 16.4 parts of anhydrous sodium acetate and 100 parts by volume of a 1-molar solution of copper sulfate are added, and the temperature is maintained at 70–80° C. for one hour. By the addition of sodium chloride the complex copper compound is completely precipitated, and it is then filtered off and washed with water containing sodium chloride.

Acylation with β-chloropropionyl chloride is carried out by dissolving the filter paste of the coppered monoazo-dyestuff in 1000 parts of water and 33 parts of anhydrous sodium acetate at 40–45° C., and 12.7 parts of β-chloropropionyl chloride are run in. The acylated dyestuff precipitates out, and is filtered off and dried.

A turquoise blue print is obtained by using, instead of the aforesaid complex copper compound, the dyestuff of the formula

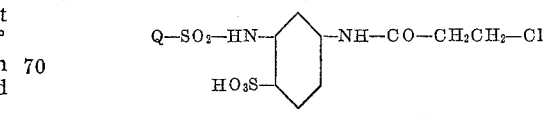

in which Q represents the residue of copper-phthalocyanine-4:4':4''-trisulfonic acid bound in the 4'''-position to the —SO₂—NH— group.

Example 8

2 parts of the dyestuff of the formula

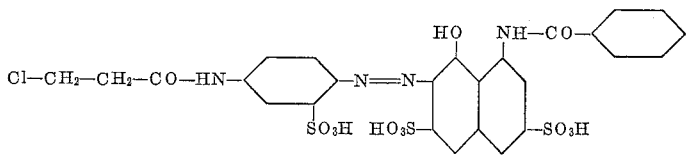

are dissolved in admixture with 2 parts of sodium carbonate and 4 parts of urea in 100 parts of water.

A cotton fabric is impregnated with the resulting solution at room temperature, and then squeezed until its increase in weight is 75%. The fabric is then dried and steamed for 6 minutes at 100–101° C., rinsed, and soaped for 15 minutes at the boil in a solution of 0.3% strength of a non-ionic detergent, rinsed and dried.

There is obtained a brilliant violet dyeing fast to boiling.

If the fabric after being dried, is subjected for 6 minutes to the action of dry heat at 160° C., instead of being steamed, and otherwise proceeding as described above, a similarly good result is obtained.

A similar result is obtained by replacing the 2 parts of sodium carbonate in the impregnating solution by 2 parts of sodium hydroxide and otherwise proceeding as described above.

Example 9

2 parts of the dyestuff mentioned in Example 8 are mixed with 8 parts of urea and dissolved at the boil in 40 parts of water. The solution is stirred into 40 parts of an alginate thickening of 5% strength, and after cooling the mixture 10 parts of sodium carbonate solution of 20% strength are added. A cotton fabric is printed with this printing color on a roller printing machine, dried, steamed for 6 minutes at 100–101° C., rinsed and soaped for 15 minutes at the boil in a solution of 0.3% strength of a non-ionic detergent, rinsed and dried. There is obtained a violet print which is fast to washing.

Example 10

2 parts of the dyestuff of the formula

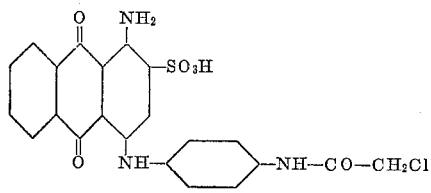

are dissolved in admixture with 2 parts of sodium carbonate and 10 parts of urea in 100 parts of water at 50° C. A cotton fabric is impregnated with the resulting solution, then squeezed to a weight increase of 75%, dried and subjected for 6 minutes to the action of dry heat at 160° C. The fabric is rinsed and soaped for 15 minutes at the boil in a solution of 0.3% strength of a non-ionic detergent, rinsed and dried. There is obtained a blue dyeing which is fast to light and washing.

What is claimed is:

1. A process for coloring polyhydroxylated materials of fibrous structure, wherein an organic dyestuff which contains at least one water solubilizing group and at least one β-chloroproprionylamino group is fixed on the polyhydroxylated material by heating in the presence of an acid-binding agent.

2. A process for coloring polyhydroxylated materials of fibrous structure, wherein an organic water-soluble dyestuff selected from the group consisting of a phthalocyanine, and anthraquinone and an azo dyestuff containing a sulfonic acid group and a β-chloropropionylamino group is fixed on the polyhydroxylated material by heating in the presence of an acid-binding agent.

3. A process for coloring cellulosic materials of fibrous structure wherein a water-soluble anthraquinone dyestuff containing a β-chloropropionylamino group is padded on the cellulosic material and then steamed in the presence of alkali.

4. A process for coloring cellulosic materials of fibrous structure wherein a water-soluble monoazo dyestuff containing at least 2 sulfonic acid groups and an alkanolamino group having a chlorine atom in β-position of the alkyl group is padded on the cellulosic material and then steamed in the presence of alkali.

5. A process for coloring cellulosic materials of fibrous structure wherein a water-soluble monoazo dyestuff containing a β-chloropropionylamino group is padded on the cellulosic material and then steamed in the presence of alkali.

6. A process for coloring cellulosic material of fibrous structure, wherein a water-soluble anthraquinone dyestuff containing a β-chloropropionylamino group is printed on the cellulosic material together with an inorganic acid-binding agent at least as alkaline as sodium carbonate and the printed material is steamed for 1 to 6 minutes.

7. A process for coloring cellulosic material of fibrous structure, wherein a water-soluble anthraquinone dyestuff containing a β-chloropropionylamino group is padded on the cellulosic material together with an inorganic acid-binding agent at least as alkaline as sodium carbonate, and the material is dried and steamed.

8. A process for coloring cotton, wherein the cotton is padded with an aqueous alkaline solution containing together a water-soluble monoazo dyestuff containing a β-chloro-propionylamino group and an inorganic acid-binding agent at least as alkaline as sodium carbonate, and the thus-padded cotton is dried and steamed.

9. A process for coloring cellulosic materials of fibrous structure wherein the material is padded with an aqueous solution of a water-soluble monoazo dyestuff containing a sulfonic acid group as water-solubilizing group and a β-chloropropionylamino group and then with an aqueous saline solution of an alkali metal hydroxide and the thus-padded material is steamed.

10. A process for coloring cotton, wherein cotton is printed with a printing paste containing an alkali metal carbonate and a water-soluble monoazo dyestuff having at least two sulfonic acid groups and a β-chloropropionylamino group and the printed cotton is steamed for 3 to 5 minutes.

11. The process of claim 8 wherein the monoazo dyestuff used corresponds to the formula

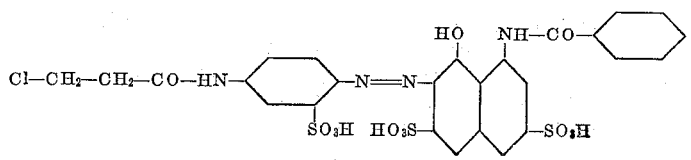

12. The process of claim 6, wherein the anthraquinone dyestuff used corresponds to the formula

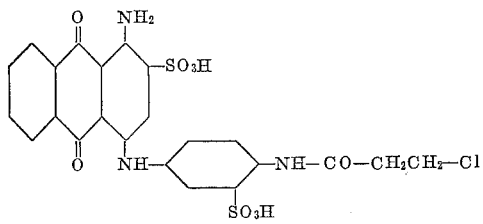

13. The process of claim 7 wherein the anthraquinone dyestuff used corresponds to the formula

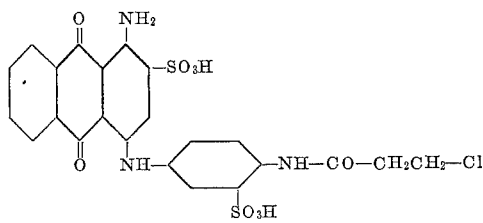

14. The process of claim 9, wherein the monoazo dyestuff used corresponds to the formula

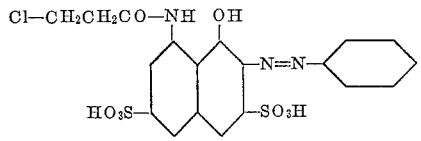

15. A process for coloring a polyhydroxylated material of fibrous structure with an organic dyestuff containing at least one water-solubilizing group and at least one group of the formula $$X(CH_2)_nCOHN$$

wherein X is a halogen and $n$ represents a whole number up to 2, which comprises heating the said polyhydroxylated materials, in contact with said organic dyestuff in the presence of an acid-binding agent, whereby the said dyestuff is fixed on the said polyhydroxylated material.

16. A fibrous cellulose structure coloured with an organic dyestuff which contains attached directly to at least one carbon atom in a cyclic ring system of said dyestuff a substituent having the formula $$-NH-CO-CH_2-CH_2-Cl$$

References Cited in the file of this patent
UNITED STATES PATENTS

| | | |
|---|---|---|
| 2,123,154 | Schirm | July 5, 1938 |
| 2,743,267 | Heyna | Apr. 24, 1956 |

FOREIGN PATENTS

| | | |
|---|---|---|
| 886,139 | Germany | Aug. 10, 1953 |
| 305,396 | Switzerland | May 2, 1955 |